United States Patent
Kovalev (10) Patent No.: US 10,423,690 B2
(45) Date of Patent: Sep. 24, 2019

(54) METHOD OF AND SERVER FOR CLASSIFYING A WEB RESOURCE

(71) Applicant: YANDEX EUROPE AG, Lucerne (CH)

(72) Inventor: Andrey Valentinovich Kovalev, Serpukhov (RU)

(73) Assignee: YANDEX EUROPE AG, Lucerne (CH)

(*) Notice: Subject to any disclaimer, the term of this patent is extended or adjusted under 35 U.S.C. 154(b) by 82 days.

(21) Appl. No.: 15/861,981

(22) Filed: Jan. 4, 2018

(65) Prior Publication Data

US 2018/0285466 A1   Oct. 4, 2018

(30) Foreign Application Priority Data

Apr. 4, 2017   (RU) .................... 2017111278

(51) Int. Cl.
| | |
|---|---|
| *G06F 15/173* | (2006.01) |
| *G06F 16/955* | (2019.01) |
| *H04L 29/08* | (2006.01) |
| *G06F 16/9535* | (2019.01) |

(52) U.S. Cl.
CPC ........ *G06F 16/955* (2019.01); *G06F 16/9535* (2019.01); *H04L 67/02* (2013.01); *H04L 67/146* (2013.01); *H04L 67/22* (2013.01)

(58) Field of Classification Search
CPC . G06F 16/955; G06F 16/9635; H04L 67/146; H04L 67/02; H04L 67/22
USPC ........................................................ 709/224
See application file for complete search history.

(56) References Cited

U.S. PATENT DOCUMENTS

| | | | |
|---|---|---|---|
| 8,745,740 B2 | 6/2014 | Oh et al. | |
| 9,015,130 B1* | 4/2015 | Michaelis | G06Q 10/00 707/689 |
| 9,178,904 B1 | 11/2015 | Gangadharan et al. | |
| 10,019,533 B2* | 7/2018 | Levi | G06F 16/9577 |

(Continued)

FOREIGN PATENT DOCUMENTS

RU            117657 U1      6/2012

OTHER PUBLICATIONS

English Abstract for RU117657 retrieved on Espacenet on May 22, 2018.

(Continued)

*Primary Examiner* — Krisna Lim
(74) *Attorney, Agent, or Firm* — BCF LLP (57) ABSTRACT

There is disclosed a method and a system for classifying a web resource. The method comprises retrieving data associated with a plurality of browser logs of browser applications. The browser logs include information about past browsing activities: an identifier of a given web resource associated with an access attempt, an indication of a parent process that initiated the access attempt, and a first launch parameter. In response to (i) the first launch parameter being indicative of the access attempt being executed as part of the first launch of the browser application and (ii) the parent process not being listed in a parent process white list, analyzing the plurality of past search session log of a search engine server to determine a historical search parameter associated with the given web resource. Based on the analysis of the historical search parameter, adding the given web resource to a blacklist of web resources.

20 Claims, 4 Drawing Sheets

(56) References Cited

U.S. PATENT DOCUMENTS

2009/0287658 A1* 11/2009 Bennett ................. G06F 16/951
2012/0084133 A1*  4/2012 Ross ................... G06F 11/3438
                                                                705/14.27
2012/0324568 A1   12/2012 Wyatt et al.
2014/0244572 A1*  8/2014 Hill ....................... G06F 16/958
                                                                707/603
2016/0342317 A1* 11/2016 Lim .................... G10L 15/1822
2018/0060412 A1*  3/2018 Krasnikov ............. G06Q 30/02
2018/0285466 A1* 10/2018 Kovalev ................. H04L 67/22

OTHER PUBLICATIONS

Search Report with regard to the counterpart patent application No. RU 2017111278 completed Apr. 12, 2018.

\* cited by examiner

METHOD OF AND SERVER FOR CLASSIFYING A WEB RESOURCE

CROSS-REFERENCE

The present application claims priority to Russian Patent Application No. 2017111278, entitled "Method of and Server for Classifying a Web Resource," filed Apr. 4, 2017, the entirety of which is incorporated herein by reference.

FIELD

The present technology relates to processing web resources in general and, more specifically, to a method of and a server for classifying a web resource.

BACKGROUND

In recent years, the use of personal electronic devices has expanded exponentially. A typical user has access to multiple devices—desktop computers, laptop computers, smart phones, tablets, and the like. Users use these electronic devices for a plethora of reasons—both professional and personal. Irrespective of the purpose of the use, a typical electronic device contains a wealth of personal information—both in a form of personal files (such as documents and the like), as well as various cookies and other metadata that may contain user-sensitive information (such as online banking access user names and passwords, personal information, such as passport numbers, credit card numbers, and the like).

Not surprisingly, this trend has also created another trend in malicious individuals and organizations trying to improperly access users' electronic devices to obtain personal information that can be then used for malicious purposes. As such, it is a well understood problem in the computer technologies that electronic devices are subjects to threats from a plethora of viruses, Trojan horses and other malicious software that is being distributed to users' electronic devices via the Internet.

It is also known that some sources of such malicious software attempt to insert harmful code into various software packages that may be distributed via the Internet (i.e. "piggy-backing" on the otherwise legitimate software). The harmful code may also get downloaded onto users' electronic devices when visiting certain web resources (typically, those storing gambling applications, pornographic materials, and the like).

Anti-viruses (and other security applications) have been created to prevent downloading and installation of such malicious code onto user electronic devices. Since anti-virus software providers constantly update their lists of harmful viruses, some sources of malicious software opt out to cause downloading of an otherwise "harmless" software code onto the user's electronic device. Such software code is configured to cause the software to be self-installed on the user's electronic device, such software causing the electronic device to launch its browser and to access (i.e. to open) a particular web resource. Such the web resource access by the user's electronic device contains viruses, phishing pages, porn, annoying advertisements, and the like.

U.S. 2012/0324568 discloses that on mobile communications device, visiting a link from a messaging application or web browser may result in an undesired action, such as visiting a phishing site, downloading malware, causing unwanted charges, using too much battery, or the device being exploited. In an implementation, a mobile application intercepts a request including an identifier associated with an action to be performed by another application on the device and evaluates the identifier to determine when the request should be permitted, blocked, or conditionally permitted. The client may use local data or make a request to a server to evaluate the identifier. In an implementation, server communications are optimized to minimize latency by caching evaluation results on the device, proactively priming the device's DNS cache, optimizing when DNS lookups are performed, and adapting evaluation policy based on factors such as the source of the request, and the currently active network connection.

U.S. Pat. No. 9,178,904 discloses systems, methods and computer program products for detecting computer malware. In one example, a security server receives information about a suspicious software object detected by a client computer using one or more malware detection methods. The server identifies the malware detection methods used to detect the suspicious object, and selects one or more different malware detection methods to check whether the suspicious object is malicious or clean. The server analyzes the suspicious object using the selected one or more different malware analysis methods to check whether the object is malicious or clean. If the object is determined to be malicious, the server generates and sends to the client computer detection instructions specific to the one or more malware detection methods used by the client computer for detecting and blocking the malicious object on the client computer.

U.S. Pat. No. 8,745,740 discloses an apparatus for detecting malicious sites, comprising: a monitoring unit for monitoring all processes being executed in a computing apparatus; a hook code insertion unit for inserting a hook code in a process executed in a browser when the execution of the browser is detected by the monitoring unit; a danger level determining unit that, upon the detection of a website movement, uses the hook code to inspect a stack structure of a process implemented according to the website movement and determine whether or not to perform the stack structure inspection, and determines whether or not the website to which the movement has been made is a malicious site; and a database for storing a list of sites determined to be malicious.

SUMMARY

Developers of the present technology have appreciated at least one technical problem associated with the prior art approaches to determining web resources that are sources of malicious software or otherwise cause user electronic devices to execute malicious activities. Without wishing to be bound to any specific theory, developers of the present technology have developed embodiments thereof based on a premise that malicious web sites can be identified by analyzing (i) logs of browsing activities of user electronic devices (to determine access attempts to web resources that are associated with a so called "first launch parameter") and (ii) search engine search logs (to determine general popularity of the such web resources that are associated with the high number of the first launch parameters (i.e. those web sites that are frequently requested automatically by a parent process that is not otherwise listed in a white list of parent processes).

Without wishing to be bound to any specific theory, the fundamental premise of embodiments of the present technology is analysis of mis-alignment between (i) frequency of first launch access attempts to a given web resource with (ii)

general popularity of the given web resource (using its popularity in searching sessions as maintained in logs of the search engine).

The methods and systems described herein identify a given web resource as a malicious one if the given web site: (i) has a comparatively high frequency of first launch access attempts and (ii) has a generally low popularity in searching sessions as maintained in logs of the search engine (for example, it is not indexed by the search engine, it appears in low positions of Search Engine Results Page (SERPs), it is associated with a low click through activity, is associated with frequent "negative connotation" search queries).

In order to accomplish the above aim, browser applications installed on user devices generate logs of website accesses and send the so-generated logs to a processing server. Each log entry corresponding to an access attempt to a given web resource contains a record of a parent program (or process), i.e. the program that initiated the access attempt. Additionally, each log entry contains a parameter indicative of whether the access attempt is associated with a "first launch of the browser", i.e. whether the browser was launched on the given user electronic device for the first time (in a browsing session, i.e. a given session after the browser application has been closed and started anew) when it executed the access attempt to the given website.

In accordance with embodiments of the present technology, analysis of the indication of the first launch allows for optimization of processing resources at the processing server, while ensuring acceptable quality of identification of malicious web resources. More specifically, due to the fact that malicious software frequently launches the browser application to access malicious web resource, even when the user is not browsing using the browsing application (e.g. right after the computer is turned on, when the user is using another application for word processing or the like, etc.).

When the processing server receives the logs of browsing activities, the processing server identifies access attempts, which are associated with a "suspicious" parent programs (or processes) and a positive first launch parameter. A suspicious parent program (or process) may be the program that is neither included into a blacklist of harmful processes nor into a whitelist of allowed parent programs/processes. If the program is considered suspicious the processing server accesses a search engine database to determine whether a web resource associated with the access attempt triggered by the parent program/process demonstrate suspicious characteristics such as: not being present in search engines records, low position in search result rankings, low organic user traffic to the web resource; small number of displays of the web resource in search engine history; a disproportion between organic traffic to the web resource and traffic generated by suspicious parent processes.

If these characteristics retrieved from search engine database indicate that the web resource is likely to be undesirable, then the web resource and/or the parent process which associated therewith are added to the blacklist. Adding parent processes and web resources to the blacklist may be done after a sufficient amount of statistics on first launch events is accumulated by the analysis of logs. When a new attempt to access any web resource from the blacklist is made on a user electronic device, the processing server determines the match in the blacklist and sends a message to the user electronic device, which message causes the browser application of the user electronic device not to open the requested web resource and/or to show a notification to the user, which would warn the user that some program is trying to access a web resource, which may be harmful or otherwise undesirable.

The blacklist of undesirable websites may be stored on the processing server (which can be used as a proxy for requests from user electronic devices or alternatively may be sent to and stored on the user electronic device.

In accordance with a first broad aspect of the present technology, there is provided a method for classifying a web resource. The method is executable on a server communicatively coupled to a plurality of user devices. The method comprises: retrieving data associated with a plurality of browser logs associated with browser applications installed on the plurality of user devices, the plurality of browser logs containing information associated with past browsing activities of at least some of the browser applications associated with at least some of the plurality of user devices; a given record of the plurality of browser logs being associated with a given past browsing activity, the given record containing data representative of: an identifier of a given web resource associated with an access attempt during the given past browsing activity, an indication of a parent process that initiated the access attempt, by the browser application, to the given web resource; and a first launch parameter indicative of whether the access attempt was executed as part of a first launch of the browser application; analyzing the first launch parameter and the indication of the parent process contained in each of the records; for each record of the plurality of browser logs, the record being associated with the given past browsing activity, in response to (i) the first launch parameter being indicative of the access attempt being executed as part of the first launch of the browser application and (ii) the parent process not being listed in a parent process white list, executing: accessing a search history log associated with a search engine server, the search history log storing a plurality of past search sessions executed on the search engine server; analyzing the plurality of past search sessions to determine a historical search parameter associated with the given web resource; in response to the historical search parameter being below a pre-determined threshold, adding the given web resource to a blacklist of web resources.

In some implementations of the method, the determining the historical search parameter associated with the given web resource comprises: analyzing at least one of a display rate and a visits rate data associated with the given web resource, the at least one of the display rate and the visit rate data being stored in the search history log; and wherein a value of the search resource parameter is proportionate to the at least one of the display rate and the visits rate of the given web resource.

In some implementations of the method, the pre-determined threshold is selected such that a lower value thereto is indicative that the given web resource is not frequently present in the past search sessions.

In some implementations of the method, the determining the historical search parameter comprises analyzing negative-connotation search queries associated with the given web resource.

In some implementations of the method, the determining the search parameter further comprises analyzing an average position of the given web resource on a plurality of Search Engine Result Pages (SERPs), an indication of which is stored in the search history log.

In some implementations of the method, the determining the historical search parameter further comprises analyzing a ratio of access attempts to the given web resource that have a positive first launch parameter and organic accesses to the to the given web resource, the indication of the organic accesses to the given web resource stored in the search history log.

In some implementations of the method, the adding the given web resource to the blacklist of web resources is further executed in response to a ratio of the access attempts to the given web resource, the access attempts being associated with the first launch of the browser application, being disproportionately high compared to the historical search parameter.

In some implementations of the method, the determining the historical search parameter comprises generating a feature vector associated with the given web resource, the feature vector being based on data associated with the given web resource stored in the search history log.

In some implementations of the method, the method further comprising generating a plug-in parameter, the plug-in parameter indicative on the number of plug-ins installed by the given web resource, the plug-in parameter being based on data associated with the given web resource stored in the search history log.

In some implementations of the method, the method further comprises: receiving from a given user device an indication of a browser application attempting to access a given web resource; responsive to the given web resource being included into the blacklist, transmitting to the given user device a trigger configured to cause the browser application to execute a security action.

In some implementations of the method, the server and the search engine server are implemented as a single server and wherein the accessing the search history log associated with the search engine server comprises accessing the search history log comprises accessing a memory of the single server storing the search history log.

In some implementations of the method, the accessing the search history log associated with the search engine server comprises transmitting a request to the search engine server to perform a search of the search history log.

In some implementations of the method, the first launch parameter has been generated in response to the access attempt being a first access request in a log in session.

In some implementations of the method, the indication of the parent process has been generated by an operating system of an electronic device with which the given record is associated.

In some implementations of the method, the method further comprises populating the parent process white list based on an analysis of a plurality of potential parent processes and assigning each of the plurality of potential parent processes one of a plurality of pre-defined categories and wherein the parent process white list is pre-populated with identification of parent processes of some of the plurality of pre-defined categories.

In some implementations of the method, the identifier of the given web resource comprises a Unique Resource Location (URL) and wherein the method further comprises normalizing the URL.

In some implementations of the method, the normalizing the URL comprises normalizing the URL to a pre-determined level domain.

In some implementations of the method, the method further comprises storing an indication of the given web resource in the blacklist of web resources, the blacklist being stored in a memory.

In some implementations of the method, the memory is one of a server memory of the server and a device memory of at least one of the plurality of user devices.

In some implementations of the method, the method further comprises transmitting a copy of the blacklist to at least some of the plurality of user devices.

In accordance with another broad aspect of the present technology, there is provided a server. The server comprises: a processor, a memory coupled to the processor, the memory storing computer-executable instructions, which instructions when executed cause the processor to execute: retrieving data associated with a plurality of browser logs associated with browser applications installed on the plurality of user devices, the plurality of browser logs containing information associated with past browsing activities of at least some of the browser applications associated with at least some of the plurality of user devices; a given record of the plurality of browser logs being associated with a given past browsing activity, the given record containing data representative of: an identifier of a given web resource associated with an access attempt during the given past browsing activity, an indication of a parent process that initiated the access attempt, by the browser application, to the given web resource; and a first launch parameter indicative of whether the access attempt was executed as part of a first launch of the browser application; analyzing the first launch parameter and the indication of the parent process contained in each of the records; for each record of the plurality of browser logs, the record being associated with the given past browsing activity, in response to (i) the first launch parameter being indicative of the access attempt being executed as part of the first launch of the browser application and (ii) the parent process not being listed in a parent process white list, executing: accessing a search history log associated with a search engine server, the search history log storing a plurality of past search sessions executed on the search engine server; analyzing the plurality of past search sessions to determine a historical search parameter associated with the given web resource; in response to the historical search parameter being below a pre-determined threshold, adding the given web resource to a blacklist of web resources.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression a "search query result set" is a listing of results returned by a search engine, which may encompass one or more general or specialized search modules, in response to a search query. Search query result set may contain a listing of results returned by a web search module, or by one or more vertical search modules, or by combination of results returned by web module and one or more vertical modules. The search query result set may also contain no results.

In the context of the present specification, the expression "plurality of search results" is intended to include a set of more than one search result, where general (e.g., Web) search results and/or vertical search results are integrated together within the set of search results or on a search results page. For example, vertical search results may be integrated into general (e.g., Web) search results within a search results page, or vice-versa, i.e., general search results may be integrated into vertical search results within a search results page. Thus, in some embodiments, general search results and vertical search results may be aggregated and ranked relative to each other. In alternative embodiments, a plurality of search results may include only general search results or only vertical In the context of the present specification, the expression a "Search Engine Result Page" or simply SERP is a listing of results to be displayed to a client on an electronic device, the listing generated by combining a search query result set with targeted messages.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
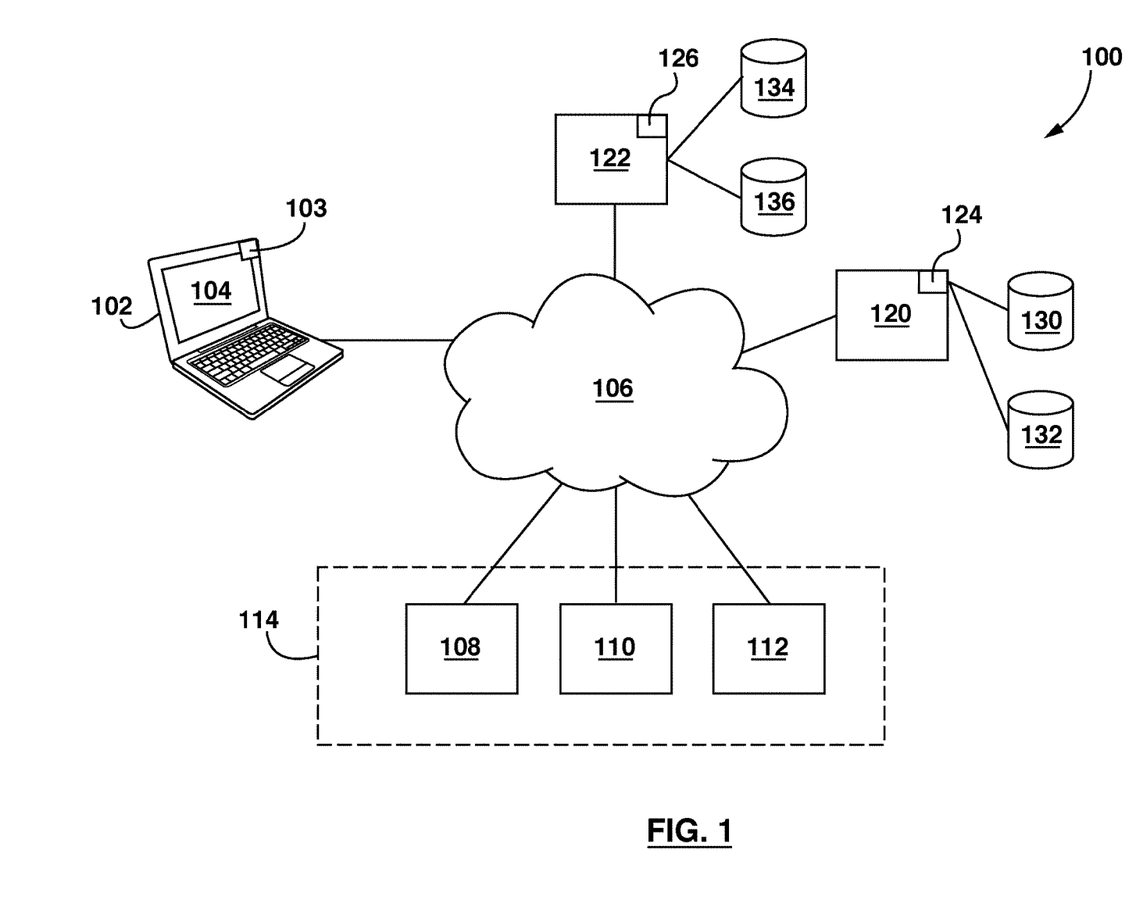
FIG. 1 depicts a diagram of a system implemented in accordance with non-limiting embodiments of the present technology.

FIG. 1 illustrates a system 100 in accordance with one implementation of the present technology. It is to be expressly understood that the system 100 is merely one possible implementation of the present technology. Thus, the description thereof that follows is intended to be only a description of illustrative examples of the present technology. This description is not intended to define the scope or set forth the bounds of the present technology. In some cases, what are believed to be helpful examples of modifications to system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances a simple implementation of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like. Naturally, the system 100 can have a plurality of electronic devices similar to or different from the electronic device 102.

The implementation of the electronic device 102 is not particularly limited, but as an example, the electronic device 102 may be implemented as a personal computer (desktops, laptops, netbooks, etc.) or a wireless electronic device (a cell phone, a smartphone, a tablet and the like). In the example depicted with reference to FIG. 1, the electronic device 102 is implemented as a lap top, such as a 13-inch MacBook Pro™ (having: a 13.3-inch LED-backlit display with IPS technology, 2560-by-1600 native resolution at 227 pixels per inch; a 2.9 GHz dual-core sixth-gen Intel Core i5 processor; and Intel™ Iris Graphics 550. 8 GB of RAM.; a 256 GB SSD; and a Touch Bar) provided by Apple Inc, Apple Campus, 1 Infinite Loop, Cupertino, Calif., United States of America.

The general implementation of the electronic device 102 is known in the art and, as such, will not be described here at much length. Suffice it to say that the electronic device 102 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over a communication network 106; and a processor coupled to the user input interface, the user output interface and the network communication interface, the processor being configured to execute various routines, including those described herein below. To that end the processor may store or have access to computer readable commands which commands, when executed, cause the processor to execute the various routines described herein.

The above-mentioned communication network 106 can be implemented as the Internet. In other embodiments of the present technology, the communication network 106 can be implemented differently, such as any wide-area communication network, local-area communication network, a private communication network and the like.

The electronic device 102 comprises hardware and/or software and/or firmware (or combinations thereof) that enable the electronic device 102 to execute a browser application 104. The browser application 104 is configured to enable the user to access one or more network resources via the communication network 106, such as a first network resource 108, a second network resource 110 and a plurality of additional resources, jointly depicted in FIG. 1 at 112. The browser application 104 can be implemented as one of: Mozilla Firefox™, Google Chrome™, Yandex™ browsers. It is noted that the electronic device 102 can have multiple versions (from the same or different providers) of the browser application 104 installed thereon.

Each one of the first network resource 108, the second network resource 110 and the plurality of additional resources 112 can be a web site (such as that for the Amazon™ online store, w Wikipedia™ information resource, a web sit associated with the Canadian Cancer Foundation, etc.), a aggregator web resource, or the like. Some or all of the first network resource 108, the second network resource 110 and the plurality of additional resources can be hosted one or more network resource servers, jointly depicted in FIG. 1 at 114. The type of information available from the first network resource 108, the second network resource 110 and the plurality of additional resources 112 can include a variety of content types, such as photos, video, audio and the like, and relates to a wide range of topics, such as but not limited to news, weather, traffic, entertainment, finance and the like.

Generally, when the user of the electronic device 102 is desirous of accessing information available from one of the first network resource 108, the second network resource 110 and the plurality of additional resources 112, the user can access the web resource either directly (either by typing an address of the resource (typically an URL or Universal Resource Locator, such as www.webpage.com) or by clicking a link in an e-mail or in another web resource. Browser application 104 typically also provides a search function that allows the user to search for information on a topic of interest (as will be described in greater detail herein below).

The electronic device 102 is further configured to execute a device process controller 103. The device process controller 103 can be executed by either the browser application 104 or by an Operating System (OS) of the electronic device 102 (or both). The device process controller 103 can be executed by any other suitable process that runs on the electronic device 102.

The device process controller 103 is configured to determine inter alia a parent process (or a parent application or a parent program) that initializes the various processes to be executed by the electronic device. Just as one example, the device process controller 103 is configured to determine which parent process has triggered executed of the browser application 104. In some embodiments, the identification of the parent process is executed based on a process ID assigned by the OS of the electronic device. This is also known as a "Parent_Process_ID" provided by the OS.

Depending on the implementation of the electronic device 102 the process of acquisition of the parent process ID (Parent_Process_ID) may vary. As a non-limiting example, in some UNIX systems (including Linux/Mac systems), the parent process ID (Parent_Process_ID) may be retrieved via the command line with command "ps —ef", using the ps_utility, which outputs full information about every process running on the system. Using the C programming language in Linux systems, the parent process ID (Parent_Process_ID) may be retrieved via the command pid_t getppid (void) by including the sys/types.h and unistd.h header files files.

Parent_Process_ID) may be retrieved via the WINDOWS™ PowerShell with command "gwmi win32_process |select ProcessID,ParentProcessID,CommandLine, @{e={$_.GetOwner()User}}" using the gwmi utility or the command or "wmic process where (processid=PROCID_HERE) get parentprocessid" using the wmic utility. The parent process ID (Parent_Process_ID) may also be determined using the C++ programming language with the Windows API functions CreateToolhelp32Snapshot(), Process32First(), Process32Next(). Alternatively, the parent process ID (Parent_Process_ID) As a non-limiting example, in some Windows systems, the parent process ID (may be determined using functions found in Psaspi.dll and Kernel32.dll files to iterate through the processes running on the machine, identify the current process entry and use the current process entry to identify the parent process ID (Parent_Process_ID).

In alternative non-limiting embodiments of the present technology, in some Windows systems, the parent process ID (Parent_Process_ID) may be retrieved via an Application Program Interface (API) called (Nt)ZwQuerySystemInformation or using an EProcess structure. As is known in the art, the EProcess structure is an opaque structure that serves as the process object for a process.

In some embodiments of the present technology, the device process controller 103 is also configured to track whether the access attempt to a given network resource (i.e. the first network resource 108, the second network resource 110 and the plurality of additional resources 112) is associated with a first launch parameter.

In some embodiments of the present technology, the device process controller 103 is also configured to track whether the access attempt to a given network resource (i.e. the first network resource 108, the second network resource 110 and the plurality of additional resources 112) is associated with a first launch parameter within a given "log in session". The "log in session", as is known to one of skill in the art, can be defined as the period of activity between a user logging in and logging out of a (multi-user) system. For example, the log in session can be between the user turning on the electronic device 102 and turning it off. Alternatively, the log in session can be between the user logging in into the electronic device 102 and logging out.

On Unix and Unix-like operating systems, a login session takes one of two main forms: when a textual user interface is used, a login session is represented as a kernel session—a collection of process groups with the logout action managed by a session leader. Where an X display manager is employed, a login session is considered to be the lifetime of a designated user process that the display manager invokes.

On Windows NT-based systems, login sessions are maintained by the kernel and control of them is within the purview of the Local Security Authority Subsystem Service (LSA). Winlogon responds to the secure attention key, requests the LSA to create login sessions on login, and terminates all of the processes belonging to a login session on logout.

Some or all of the network resource servers 114 can be implemented as a conventional computer server. In an example of an embodiment of the present technology, the network resource servers 114 can be implemented as a Dell™ PowerEdge™ Server running the Microsoft™ Windows Server™ operating system. Needless to say, the network resource servers 114 can be implemented in any other suitable hardware and/or software and/or firmware or a combination thereof. It should, of course, be understood that some or all of the network resource servers 114 can be implemented differently from other of the network resource servers 114.

Also coupled to the communication network 106 is a search engine server 120 that executed a search engine application 124.

In a specific non-limiting embodiment of the present technology, the search engine server 120 can be implemented as a Dell™ PowerEdge™ Server running the Microsoft™ Windows Server™ operating system. Needless to say, the search engine server 120 can be implemented in any other suitable hardware and/or software and/or firmware or a combination thereof. Even though in the depicted embodiment the search engine server 120 is implemented as single server, in alternative embodiments of the present technology, functionality of the search engine server 120 can be distributed amongst several servers.

The search engine application 124 is configured to receive user search requests (such as those submitted via the browser application 104 of the electronic device 102) and to deliver to the browser application 104 a Search Engine Results Page (SERP) containing a ranked list of search results that are potentially responsive to the user's search query. The search results are ranked in a decreasing order of predicted relevancy. Implementation of the search engine application 124 is known to those of skill in the art.

For completion of the description presented herein, the search engine application 124 is configured to maintain a search database 130 of indexed network resources. In order to populate the search database 130, the search engine application 124 is also configured to, as is known to those of skill in the art, execute a crawler algorithm—which algorithm causes the search engine application 124 to "crawl" the Internet. In other words, the search engine application 124 "visits" some or all of the first network resource 108, the second network resource 110 and the plurality of additional resources 112 and indexes visited web sites (the first network resource 108, the second network resource 110 and the plurality of additional resources 112) into the search database 130. In some embodiments of the present technology, the search database 130 is implemented as an "inverted index" that maps potential search queries (or portions thereof) to the content of the crawled ones of the first network resource 108, the second network resource 110 and the plurality of additional resources 112.

The search engine application 124 is also configured to execute a machine learning algorithm (MLA) that is configured to match search queries to the information stored in the database and to rank such matching resources in an order of their relevancy to the search query submitted by the user.

More specifically, search engine application 124 can be configured to execute web searches and/or vertical searches. Functionality of the search engine application 124 is generally known, but briefly speaking, the search engine application 124 is configured to: (i) receive a search query from the electronic device 102; (ii) to process the search query (normalize the search query, etc.); (iii) to execute a search for web resources that are responsive to the search query by accessing the search database 130 containing an index of crawled web resources (and/or a separate index of vertical search results) and (iv) to return a ranked list of search results to the electronic device 102 for the search application to output to the user the SERP containing links to web resources that are responsive to the search query.

The search engine application 124 is further configured to maintain a search log database 132. The search log database 132 is configured to maintain information about users' past searching activities. In some embodiments, after each search is executed, the search engine application 124 is configured to store information about the search (in an anonymized form) in the search log database 132. Information so stored may include some or all of: search query submitted, search results that made up the SERP generated in response to the search query and their associated SERP rank (i.e. which position on the SERP a given search result is assigned to), click through information (which search results of the SERP were clicked), reformulations (if the user has submitted a more particularized search after the initial search request), and the like.

The search engine application 124 may further categorize some of the search queries stored in the search log database 132 under a number of pre-defined criteria. In accordance with embodiments of the present technology, one of the categories that the search engine application 124 is configured to determine is a "negative connotation category". For example, the negative connotation category of search requests can be indicative (alone or in combination with other factors) of a negative user attitude towards the subject of the search query. For example, a search query "How to delete a plug-in from XYZ resource" may be indicative of the user's negative attitude towards the plug-in from the XYZ resource. Identification of the negative connotation category can be executed by the search engine application 124 by application of certain heuristics or other rules, by application masks to search queries, by executing a machine learning algorithm, and the like.

Also coupled to the communication network 106 is a processing server 122 that executes a processing application 126.

In a specific non-limiting embodiment of the present technology, the processing server 122 can be implemented as a Dell™ PowerEdge™ Server running the Microsoft™ Windows Server™ operating system. Needless to say, the processing server 122 can be implemented in any other suitable hardware and/or software and/or firmware or a combination thereof. Even though in the depicted embodiment the processing server 122 is implemented as single server, in alternative embodiments of the present technology, functionality of the processing server 122 can be distributed amongst several servers.

The processing application 126 configured to maintain a parent processes control list 134 and a network resources control list 136.

The parent processes control list 134 maintains a list of parent processes that are "trusted" for initiating the access attempts for the browser application 104. The parent processes control list 134 can be populated by an operator of the processing application 126. The parent processes control list 134 can be populated with an ID of parent processes that frequently and/or legitimately initiate access attempts by the browser application 104. This can be done based on statistical/empirical analysis.

As an example, in some embodiments of the present technology, it may be determined that an e-mail client (such, as for example MICROSOFT™ OUTLOOK™ e-mail client) may be a parent process the frequently (and legitimately) initiative the browser application 104 and executes an access attempt. For example, this may be the case due to the fact that users typically receive electronic messages that has links embedded therein and the users typically click those link, which (if the browser application 104 is not running) would legitimately start the browser application 104 and initiative an access attempt to a web resource associated with the link that the user has "clicked" within the body of an e-mail message.

The preceding paragraph is an example of use of the whitelist maintained in the parent processes control list 134 as a "filter" to distinguish between "organic" access attempts to web resources (the first network resource 108, the second network resource 110 and the plurality of additional resources 112), i.e. those access attempts that are originated from the user of the electronic device 102, as opposed to access attempts that are originated by parent processes that are indicative of "inorganic" access attempts, that may be indicative of malicious processes being executed on the electronic device 102.

In other words, embodiments of the present technology contemplate maintaining the parent processes control list 134 as means for distinguishing "organic" access attempts (i.e. those that are user-originated, such as clicking on links in e-mails, clicking on links in other web resources displayed in another instance of the browser application 104, users clicking on search results displayed on a SERP displayed in another instance of the browser application 104, and the like) from "inorganic" access attempts (that are not directly originated from the user and that may be indicative of a potentially malicious parent process executing the access attempt). It should be noted that in some embodiments of the present technology, access attempts responsive to the user manually filling in the address bar of the browser application 104 may be considered to be "organic" traffic.

The parent processes control list 134 can be implemented as a "white list" (i.e. listing allowed parent processes) or as a "blacklist" (i.e. listing dis-allowed parent processes), as well as a combination of both a white list and a blacklist.

The network resources control list 136 maintains a list of disallowed web resources (such as one or more of the first network resource 108, the second network resource 110 and the plurality of additional resources 112) that have been determined to be undesirable in accordance with embodiments of the present technology, as will be described in greater detail herein below.

Operation of the processing application 126 in respect to populating the network resources control list 136 will now be described in greater detail, as contemplated in some non-limiting embodiments of the present technology. It is noted that what follows is an outline of some example implementations of (i) a process of collecting information about access attempts from electronic devices (such as the electronic device 102); (ii) process of enriching information collected form the electronic devices with information collected from the search log database 132; and (iii) analysis of such collected information to determine those web resources that are potentially malicious and should be added to the network resources control list 136.

This process will be described with reference to FIG. 2, which depicts a schematic process of collecting and analysing data to determine those web resources that are potentially malicious and should be added to the network resources control list 136.

Collecting Access Data from the Electronic Devices

The processing application 126 retrieves data associated with a plurality of browser logs associated with browser applications 104 installed on the plurality of user devices, the plurality of browser logs containing information associated with past browsing activities of at least some of the browser applications 104 associated with at least some of the plurality of user devices. As an example, the processing application 126 can receive a first data packet 202 from the electronic device 102, the first data packet 202 containing at least a portion of a browser log of the browser application 104.

In some embodiments of the present technology, the browser application 104 can generate the first data packet 202. In other embodiments of the present technology, a plug-in installed into the browser application 104 can generate the first data packet 202. In yet alternative embodiments of the present technology, an operating system of the electronic device 102 can generate the first data packet 202.

Figure 3:
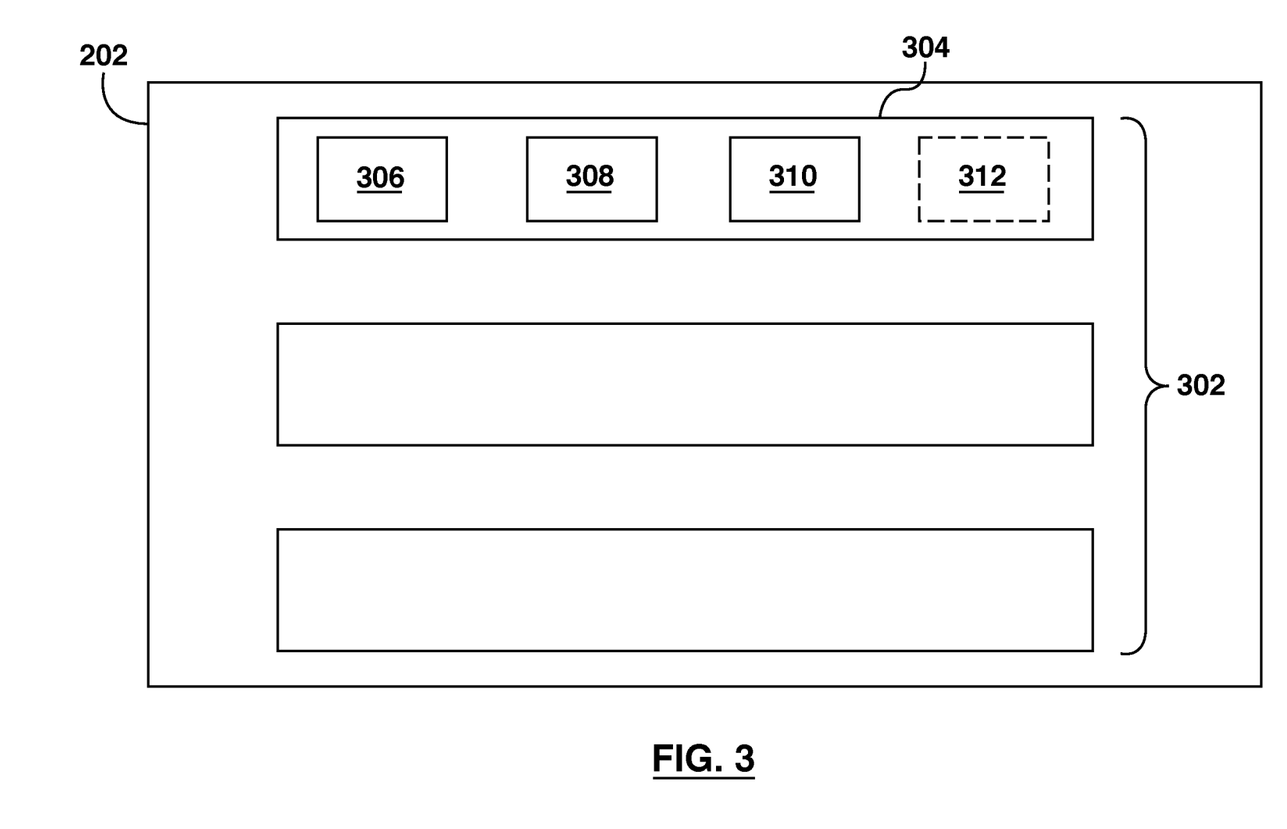
FIG. 3 depicts a schematic illustration of data contained in a first data packet that is transmitted as part of the process of FIG. 2.

With reference to FIG. 3, a schematic illustration of data contained in the first data packet 200 is depicted. The first data packet contains a plurality of records 302, only three of which are depicted in FIG. 3. Each record of the plurality of records 302 is associated with a given past browsing activity of the user using the browser application 104.

As an example, a first record 304 associated with a particular past browsing activity (i.e. browsing activity that has occurred in a point of time in the past, i.e. before the routine of FIG. 2 is executed) comprises: a web resource identifier 306 of a given web resource associated with an access attempt during the given past browsing activity, a parent process indication 308 of a parent process that initiated the access attempt, by the browser application 104, to the given web resource during the given past browsing activity; and a first launch parameter 310 indicative of whether the access attempt was executed as part of a first launch of the browser application 104.

Naturally, the first record 304 can contain an additional information field 312 that may contain additional information about one or all of: the electronic device 102, the browser application 104, the past browsing activity, and the like. An example of additional information that can be included in the additional information field 312 is an indication of a number and/or a source of plug-ins installed in the browser application 104 of the electronic device 102.

The web resource identifier 306 of the given web resource associated with an access attempt during the given past browsing activity can include a Universal Resource Locator (URL) of the web resource that was being accessed (such as the URL of one of the first network resource 108, the second network resource 110 and the plurality of additional resources 112). The parent process indication 308 of the parent process that initiated the access attempt may include the above described Parent_Process_ID that was generated (or otherwise obtained) by the device process controller 103.

The first launch parameter 310 may include an identifier of whether or not the access attempt was part of the first launch of the browser application 104. In some embodiments of the present technology, the first launch parameter 310 includes <1> when the access attempt was part of the first launch of the browser application 104 and <0> when the access attempt was not part of the first launch of the browser application 104. In other embodiments of the present technology, the first launch parameter 310 includes <YES> when the access attempt was part of the first launch of the browser application 104 and <NO> when the access attempt was not part of the first launch of the browser application 104.

In yet additional embodiments, in response to the access attempt being part of the first launch of the browser application 104, the first launch parameter 310 may be present in the first record 304 (and may include <1>, as an example); while in response to the access attempt not being part of the first launch of the browser application 104, the first launch parameter 310 may be omitted from the first record 304.

The remainder of the plurality of records 302 may be implemented in substantially the same manner as the first record 304.

Analyzing Data Collected from the Electronic Devices

In some non-limiting embodiments of the present technology, the processing application 126 can pre-process data collected from the electronic devices. In a specific non-limiting embodiment, the processing application 126 applies map reduce algorithms to pre-process data collected from the electronic devices.

The processing application 126 then analyzes the first launch parameter (i.e. information received in the first launch parameter 310 and the indication of the parent process (i.e. information received in the parent process indication 308). Broadly speaking, the processing application 126, for each record of the plurality of records 302, determines those specific records that are associated with (i) the first launch parameter being indicative of the access attempt being executed as part of the first launch of the browser application 104 and (ii) the parent process not being listed in a parent process white list (or not being listed in the blacklist, which for the purposes of the present technology is included in the parent process not being listed in the parent process white list).

More specifically, the processing application 126 then analyzes information received from electronic devices in the form similar to the first data packet 202.

First, in some embodiments of the present technology, the processing application 126 normalizes data stored in the web resource identifier 306. In some embodiments of the present technology, the processing application 126 normalizes the URL (or another type of the Universe Resource Identifier potentially stored therein instead of the URL, which for the purposes of this description is considered to be covered by the URL) stored in the web resource identifier 306 to a pre-determined level domain In some embodiments of the present technology, the processing application 126 normalizes the URL to a first level domain or a second level domain, such as for example: www.first_level_domain.com (being an example of the first level domain) or www.first_level_domain.com/sports (being an example of a second level domain). Naturally, the processing application 126 can normalize the URL to any other chosen domain level.

The processing application 126 then determines which of the web resources that were accessed during the past browsing sessions are associated with (or predominantly with) first launch parameters. To that end, the processing application 126 analyzes information contained in the first launch parameter 310 of the received information from the plurality of electronic devices (including the electronic device 102). In some embodiments of the present technology, the processing application 126 identifies those web resources that are associated with at least one first launch parameter maintained in the first launch parameter 310. In other embodiments of the present technology, the processing application 126 identifies those web resources that are associated with at a pre-determined ratio of first launch parameter maintained in the first launch parameter 310 (as opposed to non-first launch parameter).

For example, the processing application 126 can identify those web resources that are associated (across all past browsing history collected by the processing application 126) with fifty percent of access attempts being associated with the first launch parameter maintained in the first launch parameter 310. As another example, the processing application 126 can identify those web resources that are associated (across all past browsing history collected by the processing application 126) with eighty percent of access attempts being associated with the first launch parameter maintained in the first launch parameter 310. Naturally, any other ratio can be used and can be determined empirically by the operator of the processing application 126.

It should be noted that the processing application 126 analyzes a given web resource access across all users (or a portion of users), including the user of electronic device 102, as well as users of other electronic devices potentially present in the system 100. As part of the analysis, the processing application 126 creates a subset of web resources access attempts that are potentially suspicious based on the analysis of the first launch parameter 310. "Suspicious" in the context of the present description means those web resources that should be identified as malicious, as they are likely to be associated with inorganic user traffic, as opposed to the organic user traffic.

The processing application 126 then analyzes information contained in the parent process indication 308. In some embodiments of the present technology, the parent process indication 308 only analyzes the information contained in the parent process indication 308 for a subset of web resources access attempts that were determined to be potentially suspicious based on the analysis of the first launch parameter 310.

Naturally, the order of the analysis of the first launch parameter and parent process can be reversed without departing from the scope of the present technology.

The processing application 126 accesses the parent processes control list 134 that maintains the white list (and/or the blacklist) of parent processes to determine if the information maintained in the parent process indication 308 matches the information stored in the white list (and/or is not present in the blacklist). The retrieval of this information from the parent processes control list 134 is depicted in FIG. 2 as a second data packet 204.

Enriching Data Collected from the Electronic
Devices with Data Collected from the Search
Engine Then, the processing application 126 enriches data collected from electronic devices with data collected from the search engine server 120. More specifically, processing application 126 enriches a sub set of data collected from electronic devices. More specifically, the processing application 126 enriches those records of the plurality of records 302 that have been determined to be: (i) part of the subset of web resources access attempts that are potentially suspicious based on the analysis of the first launch parameter 310 and (ii) those of the subset that are associated with the parent process that is not part of the white list of the parent processes control list 134.

The processing application 126 accesses a search history log stored in the search log database 132 associated with the search engine server 120, the search history log storing a plurality of past search sessions executed on the search engine server 120. This is depicted as a third data packet 206 in FIG. 2. The processing application 126 analyzes the plurality of past search sessions to determine a historical search parameter associated with the given web resource that is being analyzed. Broadly speaking, the historical search parameter is indicative of an "objective popularity" of the given domain (first level, the second level, etc.) using the search history log as a proxy thereof. The historical search parameter, together with an indication of first launch information, enables the processing application 126 to determine a proportion of first launch accesses (inorganic accesses) to organic accesses.

The processing application 126 can analyze a plethora of parameters maintained in the search history log and only a few of them will be described herein below. It should be recalled that the processing application 126 can normalize the information stored in the web resource identifier 306 to a pre-determined level of the domain and, as such, the analysis to be described below is also executed at the same pre-determined level of the domain.

As such, the processing application 126 can analyze the information in the search history log to determine:

- If the given web resource is absent from any SERPs. Absence of the given web resource is absent from any SERPs can be indicative (alone or in combination with other factors) of the web resource being potentially malicious (i.e. undesirable, as contemplated by embodiments of the present technology).
- The number of time the given web resource has been displayed as part of any SERP (for example, over a pre-determined period of time, such as twenty four hours, a week, a month, etc.). A pre-determined threshold of displays can be established (based on analysis of empirical data, for example). A number of appearances on the SERP under the pre-determined threshold can be indicative (alone or in combination with other factors) of the web resource being potentially malicious (i.e. undesirable, as contemplated by embodiments of the present technology).
- A position of the given web resource on the SERP. As an example, an average position of the given web resource across all SERPS can be used. Alternatively, a proportion of low positions (such as for example, after a pre-determined page of the SERP) can be used. The general premise is the lower position of the given web resource can be indicative (alone or in combination with other factors) of the web resource being potentially malicious (i.e. undesirable, as contemplated by embodiments of the present technology).
- Click through information associated with the given web resource, i.e. how many times (once displayed on the SERP), a search result associated with the given web resource has been clicked. For example, a ratio of times the given web resource (once displayed on the SERP) has been clicked to the number of times the given resource (once displayed on the SERP) was "skipped" (i.e. not clicked).
- Number of times the given web resource has been part of a negative connotation search. It should be recalled that the search engine application 124 may further categorize some of the search queries stored in the search log database 132 as fall under "negative connotation category". The processing application 126 can analyze the ratio of times the search query associated with the given web resource has been categorized as having negative connotation to the number of times the search query associated with the given web resource has been categorized as not having negative connotation.
- Etc.

In some embodiments of the present technology, the processing application 126 can generate a feature vector based on the above information collected from the search log database 132. In some embodiments of the present technology, the processing application 126 can use a machine learning algorithm (MLA) to generate the feature vector. Such MLA can use any suitable algorithm to generate an n-dimensional vector of numerical features that represent information in the search history log in association with a particular web resource.

In some embodiment of the present technology, as part of generating the feature vector, the MLA employed by the processing application 126 uses dimensionality reduction algorithms, such as:
Independent component analysis
Isomap
Kernel PCA
Latent semantic analysis
Partial least squares
Principal component analysis
Multifactor dimensionality reduction
Nonlinear dimensionality reduction
Multilinear Principal Component Analysis
Multilinear subspace learning
Semidefinite embedding
Autoencoder
Deep feature synthesis In accordance with embodiments of the present technology, such generated feature vector becomes the historical search parameter associated with the given we resources. It should be noted that in alternative embodiments of the present technology, the historical search parameter can be generated in any other form, based on the information stored in the search history log.

The processing application 126 then performs an analysis of each historical search parameter respectively associated with the given web resource. This process is depicted in FIG. 2 at 208. A non-limiting example of a step-by-step implementation of such analysis will now be described in detail.

In some embodiments of the present technology, the processing application 126 analyzes the proportion of organic traffic to the given web resource (as indicated by the historical search parameter) and the non-organic traffic (as indicated by the data collected from electronic devices and analyzed as described above). For example, disproportionately high level of non-organic traffic to the given web site can be indicative (alone or in combination with other factors) of its malicious nature.

In some embodiments of the present technology, the processing application 126 analyzes the plug-ins installed on the electronic device 102 associated with the user that is associated with the given browsing session during which an access attempt was made to the given web resource. The information about plug-ins can be received from the electronic devices 102 as part of the additional information field 312. For example, disproportionately high level of installed plug-ins can be indicative (alone or in combination with other factors) of the malicious nature of the given web resource being accessed.

In some embodiments of the present technology, the processing application 126 analyzes the ratio of organic to non-organic traffic. In some embodiments of the present technology, in response to the ratio being less than one, the processing application 126 determines that the associated web resource is a malicious one (and should be added to the network resources control list 136). This determination can be a binary one—yes/no (heuristics). Alternatively, the processing application 126 can implement a multi-staged scoring process that scores (by adding/subtracting) the likelihood of the given web resource to be a malicious one (where points are added for an indication that the given web resource is malicious and points are subtracted for an indication that the given web resource is likely legitimate).

Figure 2:
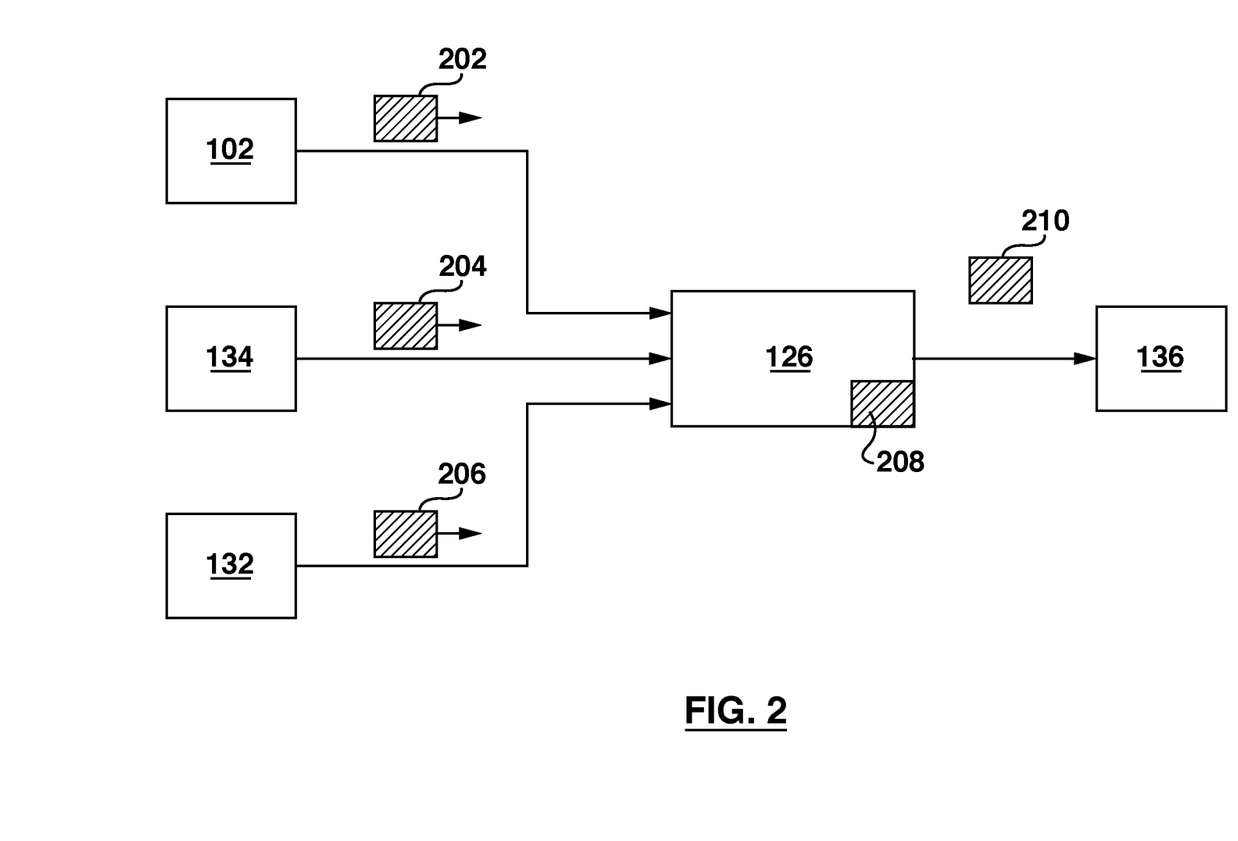
FIG. 2 depicts a schematic representation of a process of collecting and analysing data to determine those web resources that are potentially malicious and should be added to a network resources control list of the system of FIG. 1.

Once the determination is made, the processing application 126 stores an indication thereof in the network resources control list 136 (process depicted in FIG. 2 a 210). It is noted that even though the network resources control list 136 being depicted as hosted by the processing server 122, in alternative embodiments of the present technology, the network resources control list 136 can be distributed and pushed to the electronic device 102.

Optional Enhancements

In some embodiments of the present technology, the processing application 126 is further configured to maintain, as part of the network resources control list 136 or as a separate list (not depicted) a "white list" of frequently visited that may not otherwise be present in the search history log stored in the search log database 132 associated with the search engine server 120 (i.e. that may end up being associated with a negative historical search parameter as the given web resource may not appear in SERPs). Examples of such web resources include, but are not limited to: ad servers, technical servers of services, and the like.

Within these embodiments of the present technology, presence of the given web site in the white list may trump any other determination and these web sites would not be marked as malicious.

Use of the Network Resources Control List 136

We will now turn our attention to the use of the network resources control list 136 that has been populated using embodiments of the present technology. There will be described two scenarios—a server based implementation of the network resources control list 136 and a distributed (i.e. device based) implementation of the network resources control list 136.

Server-Based Implementation

In the server-based implemented solution, the processing server 122 acts as a proxy server for requests from the browser application 104. When the browser application 104 requests a particular web resources (such as the first network resource 108, the second network resource 110 and the plurality of additional resources 112), the processing server 122 receives the request, including the URL of the network resource being requested.

The processing application 126 then compares the URL to the URLs sored in the network resources control list 136. It is noted that if the white list is maintained and the URL is listed in the white list—the request is sent to the appropriate network resource for furnishing of the requested resource. If the URL is maintained in the blacklist, the processing application 126 can transmit a waning message to the browser application 104 of the electronic device 102 to display a warning message to the user that the browser application 104 may be affected by malicious code.

Device-Based Implementation

In the device-based implementation, the electronic device 102 can be provided with a copy of the network resources control list 136. The browser application 104, in these embodiments, can process the requested URL locally against the information stored in the network resources control list 136.

In some embodiments, additionally, the browser application 104 can transmit a check message to the processing application 126 to ensure that the electronic device 102 has the most up-to-date information stored in the local version of the network resources control list 136.

Returning to the description of FIG. 1, the implementation of the servers that can be used to implement some or all of: the network resource servers 114, the search engine server 120, and the processing server 122 is well known. However, briefly speaking, the such servers comprise a communication interface (not depicted) structured and configured to communicate with various entities (such as the electronic device 102, for example and other devices potentially coupled to the communication network 106; as well as enable to communication between the various servers (such as some or all of: the network resource servers 114, the search engine server 120, and the processing server 122) via the communication network 106. The servers further comprise at least one computer processor (not depicted) operationally connected with the communication interface and structured and configured to execute various processes described herein.

Given the architecture described above, it is possible to execute a method of classifying a web resource.

Figure 4:
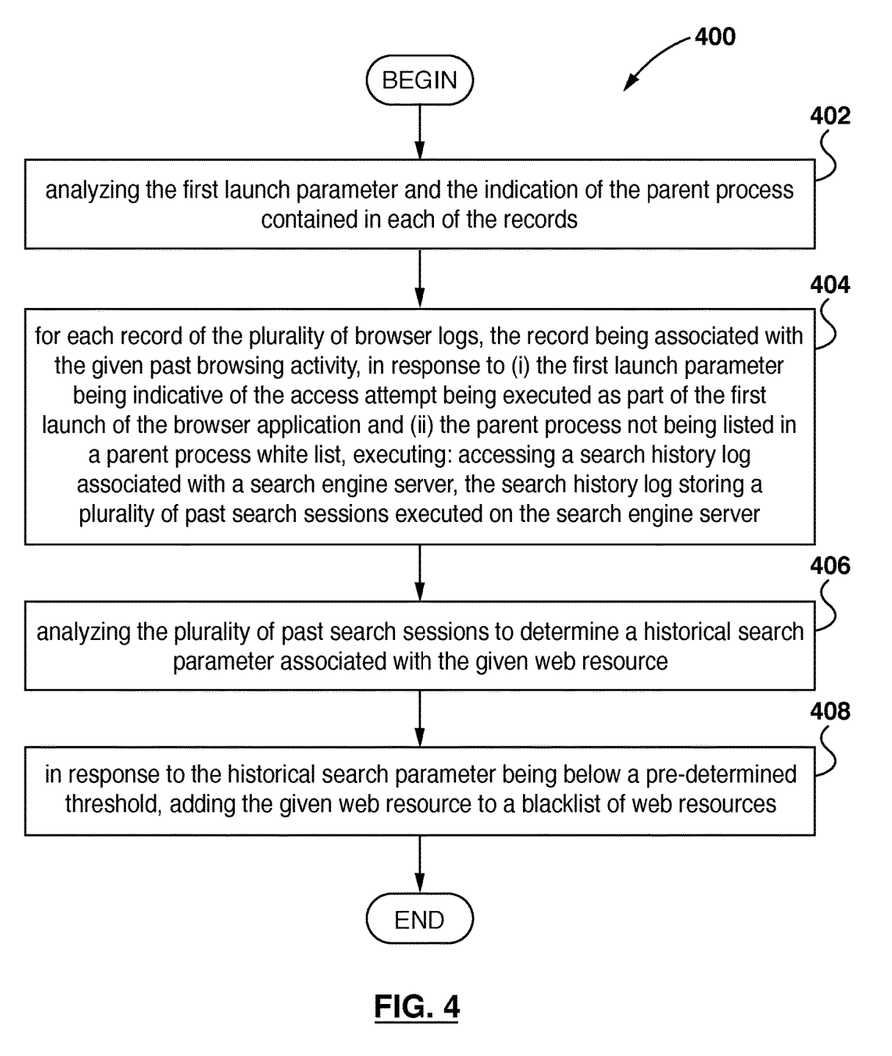
FIG. 4 depicts a block diagram of a method, the method being implemented in accordance with other non-limiting embodiments of the present technology, the method executable within the system of FIG. 1.

With reference to FIG. 4, there is depicted a block diagram of a method 400, the method 400 being implemented in accordance with non-limiting embodiments of the present technology. In some embodiments, the method 400 can be executed by the processing application 126. These embodiments will be discussed herein below. It should be recalled through that the method 400 can also be implemented locally by the electronic device 102 with appropriate modifications to the method 400.

Step 401—retrieving data associated with a plurality of browser logs associated with browser applications installed on the plurality of user devices, the plurality of browser logs containing information associated with past browsing activities of at least some of the browser applications associated with at least some of the plurality of user devices; a given record of the plurality of browser logs being associated with a given past browsing activity, the given record containing data representative of: an identifier of a given web resource associated with an access attempt during the given past browsing activity, an indication of a parent process that initiated the access attempt, by the browser application, to the given web resource; and a first launch parameter indicative of whether the access attempt was executed as part of a first launch of the browser application The method 400 begins at step 401, where the processing application 126 retrieved data associated with a plurality of browser logs associated with browser applications 104 installed on the plurality of user devices, the plurality of browser logs containing information associated with past browsing activities of at least some of the browser applications 104 associated with at least some of the plurality of user devices.

As was described with reference to FIG. 3, a given record of the plurality of browser logs being associated with a given past browsing activity, the given record containing data representative of:

an identifier of a given web resource associated with an access attempt during the given past browsing activity,
an indication of a parent process that initiated the access attempt, by the browser, to the given web resource; and
a first launch parameter indicative of whether the access attempt was executed as part of a first launch of the browser.

It should be recalled from the above that the first record 304 associated with a particular past browsing activity (as an example of information stored in the given record) comprises: the web resource identifier 306 of the given web resource associated with an access attempt during the given past browsing activity, the parent process indication 308 of the parent process that initiated the access attempt, by the browser application 104, to the given web resource during the given past browsing activity; and the first launch parameter 310 indicative of whether the access attempt was executed as part of a first launch of the browser application 104.

Step 402—analyzing the first launch parameter and the indication of the parent process contained in each of the records At step 402, the processing application 126 analyzes the first launch parameter and the indication of the parent process contained in each of the records. More specifically, the processing application analyzes data received as part of the parent process indication 308 and the first launch parameter 310.

Step 404—for each record of the plurality of browser logs, the record being associated with the given past browsing activity, in response to (i) the first launch parameter being indicative of the access attempt being executed as part of the first launch of the browser and (ii) the parent process not being listed in a parent process white list, executing: accessing a search history log associated with a search engine server, the search history log storing a plurality of past search sessions executed on the search engine server At step 404, the processing application 126 for each record of the plurality of browser logs, the record being associated with the given past browsing activity, in response to (i) the first launch parameter being indicative of the access attempt being executed as part of the first launch of the browser application 104 and (ii) the parent process not being listed in a parent process white list (stored in the parent processes control list 134), executes: accessing a search history log (stored in the search log database 132 associated with the search engine server 120), the search history log storing a plurality of past search sessions executed on the search engine server. In other words, the processing application 126 identifies those web resources that are associated with the subset that has been determined as part of step 402.

More specifically, as part of step 404, the processing application 126 creates a subset of web resources access attempts that are potentially suspicious based on the analysis of the first launch parameter 310 and the analysis of the parent process indication 308.

In some embodiments of the method 400, the identifier of the given web resource comprises a Unique Resource Location (URL) and wherein the method further comprises normalizing the URL before accessing the search history logs. The normalizing the URL comprises normalizing the URL to a pre-determined level domain. Once normalized, the accessing of the search history logs is executed using the normalized URL.

Step 406—analyzing the plurality of past search sessions to determine a historical search parameter associated with the given web resource At step 406, the processing application 126 analyzes the plurality of past search sessions to determine a historical search parameter associated with the given web resource.

It should be recalled that the historical search parameter is indicative of an "objective popularity" of the given web resource normalized to a pre-determined domain level (first level, the second level, etc.) using the search history log (stored in the search log database 132 associated with the search engine server 120) as a proxy thereof. The historical search parameter, together with an indication of first launch information, enables the processing application 126 to determine a proportion of first launch accesses (inorganic accesses) to organic accesses.

In some embodiments of the method 400, as part of step 406, the determining the historical search parameter associated with the given web resource comprises: analyzing at least one of a display rate and a visits rate data associated with the given web resource, the at least one of the display rate and the visit rate data being stored in the search history log (stored in the search log database 132 associated with the search engine server 120); and wherein a value of the search resource parameter is proportionate to the at least one of the display rate and the visits rate of the given web resource.

In some embodiments of the method 400, as part of step 406, the pre-determined threshold is selected such that a lower value thereto is indicative that the given web resource is not frequently present in the past search sessions.

In some embodiments of the method 400, as part of step 406, the determining the historical search parameter comprises analyzing negative-connotation search queries associated with the given web resource.

In some embodiments of the method 400, as part of step 406, the determining the search parameter further comprises analyzing an average position of the given web resource on a plurality of Search Engine Result Pages (SERPs), an indication of which is stored in the search history log (stored in the search log database 132 associated with the search engine server 120).

In some embodiments of the method 400, as part of step 406, the determining the historical search parameter further comprises analyzing a ratio of access attempts to the given web resource that have a positive first launch parameter and organic accesses to the to the given web resource, the indication of the organic accesses to the given web resource stored in the search history log (stored in the search log database 132 associated with the search engine server 120).

In some embodiments of the method 400, as part of step 406, the determining the historical search parameter comprises generating a feature vector associated with the given web resource, the feature vector being based on data associated with the given web resource stored in the search history log (stored in the search log database 132 associated with the search engine server 120).

In some embodiments of the method 400, as part of step 406, the method 400 further comprises generating a plug-in parameter, the plug-in parameter indicative on the number of plug-ins installed by the given web resource, the plug-in parameter being based on data associated with the given web resource stored in the search history log (stored in the search log database 132 associated with the search engine server 120).

It should be recalled that the processing application 126 can analyze the information in the search history log (stored in the search log database 132 associated with the search engine server 120) to determine:

If the given web resource is absent from any SERPs. Absence of the given web resource is absent from any SERPs can be indicative (alone or in combination with other factors) of the web resource being potentially malicious (i.e. undesirable, as contemplated by embodiments of the present technology).

The number of time the given web resource has been displayed as part of any SERP (for example, over a pre-determined period of time, such as twenty four hours, a week, a month, etc.). A pre-determined threshold of displays can be established (based on analysis of empirical data, for example). A number of appearances on the SERP under the pre-determined threshold can be indicative (alone or in combination with other factors) of the web resource being potentially malicious (i.e. undesirable, as contemplated by embodiments of the present technology).

A position of the given web resource on the SERP. As an example, an average position of the given web resource across all SERPS can be used. Alternatively, a proportion of low positions (such as for example, after a pre-determined page of the SERP) can be used. The general premise is the lower position of the given web resource can be indicative (alone or in combination with other factors) of the web resource being potentially malicious (i.e. undesirable, as contemplated by embodiments of the present technology).

Click through information associated with the given web resource, i.e. how many times (once displayed on the SERP), a search result associated with the given web resource has been clicked. For example, a ratio of times the given web resource (once displayed on the SERP) has been clicked to the number of times the given resource (once displayed on the SERP) was "skipped" (i.e. not clicked).

Number of times the given web resource has been part of a negative connotation search. It should be recalled that the search engine application 124 may further categorize some of the search queries stored in the search log database 132 as fall under "negative connotation category". The processing application 126 can analyze the ratio of times the search query associated with the given web resource has been categorized as having negative connotation to the number of times the search query associated with the given web resource has been categorized as not having negative connotation.

Etc.

Step 408—in response to the historical search parameter being below a pre-determined threshold, adding the given web resource to a blacklist of web resources At step 408, the processing application 126, in response to the historical search parameter being below a pre-determined threshold, adds the given web resource to a blacklist of web resources (i.e. stores it in the network resources control list 136). In some embodiments of the method 400, the memory is one of a server memory (i.e. the memory associated with the processing server 122 that stores the network resources control list 136) and a device memory of at least one of the plurality of user devices (i.e. the memory of the electronic device 102). In the latter embodiment, the method 400 further comprises transmitting a copy of the blacklist to at least some of the plurality of user devices (such as the electronic device 102 and the other devices potentially present in the system 100).

In some embodiments of the method 400, as part of step 408, the adding the given web resource to the blacklist of web resources is further executed in response to a ratio of the access attempts to the given web resource, the access attempts being associated with the first launch of the browser application 104, being disproportionately high compared to the historical search parameter.

In some embodiments of the method 400, the method 400 further comprises: receiving from a given user device an indication of the browser application 104 attempting to access a given web resource; responsive to the given web resource being included into the blacklist, transmitting to the given user device a trigger configured to cause the browser application 104 to execute a security action. The security action can be, for example, providing a warning message to the user of the electronic device 102. Alternatively (or additionally), the security action can be blocking access to the requested web resource.

In the illustrated embodiment of the system 100 of FIG. 1, the search engine server 120 and the processing server 122 are implemented as separate servers. Within these embodiments, the accessing the search history log (stored in the search log database 132 associated with the search engine server 120)associated with the search engine server 120 comprises transmitting a request to the search engine server 120 to perform a search of the search history log (stored in the search log database 132 associated with the search engine server 120). In alternative embodiments of the method 400, the processing server 122 and the search engine server 120 can be implemented as a single server. In those embodiments, the accessing the search history log (stored in the search log database 132 associated with the search engine server 120) associated with the search engine server 120 comprises accessing the search history log comprises accessing a memory of the single server storing the search history log (stored in the search log database 132 associated with the search engine server 120).

In some embodiments of the method 400, the first launch parameter has been generated in response to the access attempt being a first access request in a log in session.

In some embodiments of the method 400, the indication of the parent process has been generated by an operating system of the electronic device 102 with which the given record is associated.

In some embodiments of the method 400, the method 400 further comprises populating the parent process white list (maintained in the parent processes control list 134) based on an analysis of a plurality of potential parent processes and assigning each of the plurality of potential parent processes one of a plurality of pre-defined categories and wherein the parent process white list is pre-populated with identification of parent processes of some of the plurality of pre-defined categories. For example, one pre-defined category could be "allowed parent process".

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for classifying a web resource, the method executable on a server communicatively coupled to a plurality of user devices, the method comprising:
retrieving data associated with a plurality of browser logs associated with browser applications installed on the plurality of user devices, the plurality of browser logs containing information associated with past browsing activities of at least some of the browser applications associated with at least some of the plurality of user devices; a given record of the plurality of browser logs being associated with a given past browsing activity, the given record containing data representative of:
an identifier of a given web resource associated with an access attempt during the given past browsing activity,
an indication of a parent process that initiated the access attempt, by the browser application, to the given web resource; and
a first launch parameter indicative of whether the access attempt was executed as part of a first launch of the browser application;
analyzing the first launch parameter and the indication of the parent process contained in each of the records;
for each record of the plurality of browser logs, the record being associated with the given past browsing activity, in response to (i) the first launch parameter being indicative of the access attempt being executed as part of the first launch of the browser application and (ii) the parent process not being listed in a parent process white list, executing:
accessing a search history log associated with a search engine server, the search history log storing a plurality of past search sessions executed on the search engine server;
analyzing the plurality of past search sessions to determine a historical search parameter associated with the given web resource;
in response to the historical search parameter being below a pre-determined threshold, adding the given web resource to a blacklist of web resources.

2. The method of claim 1, wherein the determining the historical search parameter associated with the given web resource comprises:
analyzing at least one of a display rate and a visits rate data associated with the given web resource, the at least one of the display rate and the visit rate data being stored in the search history log; and wherein a value of the search resource parameter is proportionate to the at least one of the display rate and the visits rate of the given web resource.

3. The method of claim 2, wherein the pre-determined threshold is selected such that a lower value thereto is indicative that the given web resource is not frequently present in the past search sessions.

4. The method of claim 2, wherein the determining the historical search parameter comprises analyzing negative-connotation search queries associated with the given web resource.

5. The method of claim 2, wherein the determining the search parameter further comprises analyzing an average position of the given web resource on a plurality of Search Engine Result Pages (SERPs), an indication of which is stored in the search history log.

6. The method of claim 2, wherein the determining the historical search parameter further comprises analyzing a ratio of access attempts to the given web resource that have a positive first launch parameter and organic accesses to the given web resource, the indication of the organic accesses to the given web resource stored in the search history log.

7. The method of claim 1, wherein the adding the given web resource to the blacklist of web resources is further executed in response to a ratio of the access attempts to the given web resource, the access attempts being associated with the first launch of the browser application, being disproportionately high compared to the historical search parameter.

8. The method of claim 1, wherein the determining the historical search parameter comprises generating a feature vector associated with the given web resource, the feature vector being based on data associated with the given web resource stored in the search history log.

9. The method of claim 1, the method further comprising generating a plug-in parameter, the plug-in parameter indicative on the number of plug-ins installed by the given web resource, the plug-in parameter being based on data associated with the given web resource stored in the search history log.

10. The method of claim 1 further comprising:
receiving from a given user device an indication of a browser application attempting to access a given web resource;
responsive to the given web resource being included into the blacklist, transmitting to the given user device a trigger configured to cause the browser application to execute a security action.

11. The method of claim 1, wherein the server and the search engine server are implemented as a single server and wherein the accessing the search history log associated with the search engine server comprises accessing a memory of the single server storing the search history log.

12. The method of claim 1, wherein the accessing the search history log associated with the search engine server comprises transmitting a request to the search engine server to perform a search of the search history log.

13. The method of claim 1, wherein the first launch parameter has been generated in response to the access attempt being a first access request in a log in session.

14. The method of claim 1, wherein the indication of the parent process has been generated by an operating system of an electronic device with which the given record is associated.

15. The method of claim 1, wherein the method further comprises populating the parent process white list based on an analysis of a plurality of potential parent processes and assigning each of the plurality of potential parent processes one of a plurality of pre-defined categories and wherein the parent process white list is pre-populated with identification of parent processes of some of the plurality of pre-defined categories.

16. The method of claim 1, wherein the identifier of the given web resource comprises a Unique Resource Location (URL) and wherein the method further comprises normalizing the URL.

17. The method of claim 16, wherein the normalizing the URL comprises normalizing the URL to a pre-determined level domain.

18. The method of claim 1, further comprising storing an indication of the given web resource in the blacklist of web resources, the blacklist being stored in a memory.

19. The method of claim 18, wherein the memory is one of a server memory of the server and a device memory of at least one of the plurality of user devices.

20. A server comprising:
a processor,
a memory coupled to the processor, the memory storing computer-executable instructions, which instructions when executed cause the processor to execute:
retrieving data associated with a plurality of browser logs associated with browser applications installed on the plurality of user devices, the plurality of browser logs containing information associated with past browsing activities of at least some of the browser applications associated with at least some of the plurality of user devices; a given record of the plurality of browser logs being associated with a given past browsing activity, the given record containing data representative of:
an identifier of a given web resource associated with an access attempt during the given past browsing activity,
an indication of a parent process that initiated the access attempt, by the browser application, to the given web resource; and
a first launch parameter indicative of whether the access attempt was executed as part of a first launch of the browser application;
analyzing the first launch parameter and the indication of the parent process contained in each of the records;
for each record of the plurality of browser logs, the record being associated with the given past browsing activity, in response to (i) the first launch parameter being indicative of the access attempt being executed as part of the first launch of the browser application and (ii) the parent process not being listed in a parent process white list, executing:
accessing a search history log associated with a search engine server, the search history log storing a plurality of past search sessions executed on the search engine server;
analyzing the plurality of past search sessions to determine a historical search parameter associated with the given web resource;
in response to the historical search parameter being below a pre-determined threshold, adding the given web resource to a blacklist of web resources.

* * * * *